United States Patent
Kakunda et al.

(10) Patent No.: US 9,547,328 B2
(45) Date of Patent: Jan. 17, 2017

(54) METHODS AND APPARATUSES FOR REDUCING COMMON MODE FAILURES OF NUCLEAR SAFETY-RELATED SOFTWARE CONTROL SYSTEMS

(71) Applicants: Bishara E. Kakunda, San Jose, CA (US); Gregory S. Droba, Hampstead, NC (US); Oscar L. Meek, Wilmington, NC (US)

(72) Inventors: Bishara E. Kakunda, San Jose, CA (US); Gregory S. Droba, Hampstead, NC (US); Oscar L. Meek, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 189 days.

(21) Appl. No.: 14/178,820

(22) Filed: Feb. 12, 2014

(65) Prior Publication Data
US 2015/0227161 A1 Aug. 13, 2015

(51) Int. Cl.
*G06F 11/18* (2006.01)
*G06F 1/06* (2006.01)
(Continued)

(52) U.S. Cl.
CPC .............. *G06F 1/06* (2013.01); *G06F 11/1695* (2013.01); *G06F 11/181* (2013.01);
(Continued)

(58) Field of Classification Search
CPC .......................... G06F 11/1479; G06F 11/1695
See application file for complete search history.

(56) References Cited

U.S. PATENT DOCUMENTS

| 4,644,538 A * | 2/1987 | Cooper | ................ G05D 1/0077 |
| | | | 700/79 |
| 4,752,869 A * | 6/1988 | Miller | ...................... G05B 9/03 |
| | | | 376/215 |

(Continued)

FOREIGN PATENT DOCUMENTS

| GB | 2317032 A | 3/1998 |
| WO | 9857238 A2 | 12/1998 |
| WO | 2011101707 A1 | 8/2011 |

OTHER PUBLICATIONS

European Search Report and Opinion issued in connection with corresponding EP Application No. 15154334.5 on Jul. 24, 2015.

(Continued)

*Primary Examiner* — Phil Nguyen
*Assistant Examiner* — Gary Collins
(74) *Attorney, Agent, or Firm* — Harness, Dickey & Pierce, PLC

(57) ABSTRACT

A computing system includes at least a first division and a second division. The first division has a first clock rate and the second division has a second clock rate. The computing system includes a first processor configured to execute a task on the first division and a second processor configured to execute the task of the second division. The task executed on the first division operates according to the first clock rate, and the task executed on the second division operates according to the second clock rate. A method of executing a task in order to reduce common mode failures in a computing system includes varying a program speed of each of the plurality of divisions such that the task, when executed on a corresponding one of the plurality of divisions, operates at a clock rate according to the corresponding one of the plurality of divisions.

20 Claims, 3 Drawing Sheets

(51) Int. Cl.
*G21D 3/00* (2006.01)
*G21D 3/04* (2006.01)
*G06F 11/16* (2006.01)

(52) U.S. Cl.
CPC ........... *G06F 11/184* (2013.01); *G21D 3/001* (2013.01); *G21D 3/04* (2013.01); *Y02E 30/40* (2013.01)

(56) References Cited

U.S. PATENT DOCUMENTS

| | | | | |
|---|---|---|---|---|
| 5,086,499 | A * | 2/1992 | Mutone | G05B 9/03 |
| | | | | 714/10 |
| 5,287,492 | A * | 2/1994 | Reynders | G06F 11/1679 |
| | | | | 714/12 |
| 5,613,127 | A * | 3/1997 | Schultz | G06F 11/1691 |
| | | | | 710/260 |
| 5,621,776 | A * | 4/1997 | Gaubatz | G21C 17/00 |
| | | | | 376/215 |
| 5,984,504 | A * | 11/1999 | Doyle | G05B 9/03 |
| | | | | 376/216 |
| 6,061,412 | A * | 5/2000 | Stucker | G01T 3/006 |
| | | | | 376/217 |
| 8,479,026 | B2 | 7/2013 | Lakshmanan et al. | |
| 2004/0136487 | A1* | 7/2004 | Shin | G21D 3/04 |
| | | | | 376/259 |
| 2009/0055674 | A1* | 2/2009 | Mueller | G06F 9/30181 |
| | | | | 713/375 |
| 2011/0072313 | A1* | 3/2011 | Fuhrmann | G06F 11/0739 |
| | | | | 714/47.1 |
| 2012/0210199 | A1* | 8/2012 | Gale | G06F 11/1633 |
| | | | | 714/807 |
| 2014/0164839 | A1* | 6/2014 | Toba | H03K 19/17756 |
| | | | | 714/37 |

OTHER PUBLICATIONS

G. G. Preckshot, "Method for Performing Diversity and Defense-in-Depth Analyses of Reactor Protection Systems"; U.S. Nuclear Regulatory Commission, NUREG/CR-6303, NRC Job Code L1867; Dec. 1994.

* cited by examiner

METHODS AND APPARATUSES FOR REDUCING COMMON MODE FAILURES OF NUCLEAR SAFETY-RELATED SOFTWARE CONTROL SYSTEMS

BACKGROUND

Common cause failure (CCF) is defined as a failure of two or more structures, systems, and/or components due to a single specific event or cause. CCF may include a failure of two or more structures, systems, and/or components caused by any latent deficiency from design or manufacturing, from operation or maintenance errors, and/or which may be triggered by any event induced by natural phenomenon, power plant process operation, or human error. Common-mode failure (CMF) is a subset of CCF and occurs when two or more systems or components fail in the same way. CMF events may include failures in multiple parts of a system caused by a single fault, particularly random failures due to environmental conditions, aging, abnormal operating occurrences (AOOs), design basis accidents (DBAs), and the like.

The design criteria for nuclear power plant (NPP) safety systems include separation of redundant divisions, such as physical barriers and electrical isolation, to be generally applied as design measures to address potential vulnerabilities related to a CMF of equipment and/or the propagation of failure effects. Separation and redundancy measures tend to minimize CMFs related to shared components and/or equipment, which typically protects against random hardware failures. However, many software defects tend to have common mode failures since the software in each division is identical. Nevertheless, the potential for CMF vulnerability has long been recognized, and therefore, "diversity" is employed in order to satisfy safety requirements for NPPs.

As discussed in Preckshot, "Method for Performing Diversity and Defense-in-Depth Analyses of Reactor Protection Systems", NUREG/CR-6303, NRC Job Code L1867, which is hereby incorporated by reference in its entirety, "diversity" is "a principle in instrumentation systems of sensing different parameters, using different technologies, using different logic or algorithms, or using different actuation means to provide several ways of detecting and responding to a significant event." When applying the diversity principle in instrumentation systems CMF concerns may be mitigated or reduced.

CMF can occur in "redundant divisions" of nuclear safety equipment. Redundant divisions are divisions of nuclear safety equipment that operate the same software, operating systems, and libraries on the same hardware platform. The redundant divisions may be used to perform a safety function. A CMF that occurs at the same time is of special concern for redundant divisions because the CMF may affect each of the redundant divisions at the same time, and has the potential of degrading the safety function. Nuclear regulatory inspectors may be concerned that CMFs of software in digital safety systems defeats the benefits of redundancy through multiple divisions. The concern is that due to common hardware and software between multiple redundant divisions, a software defect may exhibit itself at the same time in each of the redundant divisions, and therefore, the equipment may be prevented from performing its safety function.

In order to overcome the CMFs in multiple redundant divisions, as discussed above, diverse hardware platforms have typically been designed to provide additional protection. For example, diversity may be provided by redesigning logic cards with two different logic devices made by different suppliers, in addition to duplicating the logic within each division. Such hardware redesigns may be expensive and cause long delays in implementation.

Thus, there exists a demand to provide diversity in multiple divisions of nuclear safety equipment, and in particular, to provide diversity in multiple divisions of nuclear safety equipment without requiring hardware redesign.

SUMMARY

At least one example embodiment relates to a computing system for executing a task according to different clock rates in order to reduce common mode failures in the computing system.

In one example embodiment the computing system includes at least a first division and a second division. The first division has a first clock rate and the second division has a second clock rate. The computing system includes a first processor configured to execute a task on the first division, and a second processor configured to execute the task on the second division. The task executed on the first division operates according to the first clock rate, and the task executed on the second division operates according to the second clock rate.

Example embodiments provide that the first processor and the second processor are further configured to determine that a trip condition exists on at least one of the first division and the second division.

Example embodiments provide that the first clock rate has a different speed than the second clock rate.

Example embodiments provide that the task is simultaneously executed on the first processor and on the second processor.

Example embodiments provide that the first division includes a first division clock configured to measure a first division time by counting a number of first division ticks that have transpired from the desired start time. Each first division tick represents an amount of time required to execute a program instruction of the task according to the first division clock rate. Example embodiments provide that the second division includes a second division clock configured to measure a second division time by counting a number of second division ticks that have transpired from the desired start time. Each second division tick representing an amount of time required to execute a program instruction of the task according to the second division clock rate.

Example embodiments provide that the computing system further includes a system clock configured to measure a system time by counting a number of system ticks that have transpired from a desired start time. The system clock has a system clock rate, where each system tick represents an amount of time required to execute a program instruction of the task according to the system clock rate.

Example embodiments provide that (i) each of the first division ticks represent both the amount of time required to execute a program instruction of the task according to the first division clock rate and a delay in initiating an execution of a next program instruction of the task, and (ii) each of the second division ticks represent both the amount of time required to execute a program instruction of the task according to the second division clock rate and a delay in initiating the execution of the next program instruction of the task.

Example embodiments provide that the first processor is further configured to vary the execution of the task on the first division based on at least one of the first division clock rate and the system time, and the second processor is further configured to vary the execution of the task on the second division based on at least one of the second division clock rate and the system time.

Example embodiments provide that each of the first division and the second division comprise at least one instrument configured to obtain data from at least one sensor or input; monitor the obtained data; generate trip information based on the obtained data; and perform a divisional voting process based on the trip information, the divisional voting process being used to detect discrepancies of at least one of the first division and the second division.

At least one example embodiment relates to a method of executing a task in order to reduce common mode failures in a computing system.

In one example embodiment the method includes dividing the computer system into a first division and a second division. The method includes defining a first clock rate for the first division and a second clock rate for the second division. The method includes executing the task on the first division and on the second division. The task executed on the first division operates according to the first clock rate, and the task executed on the second division operates according to the second clock rate.

Example embodiments provide that the method further includes determining that a trip condition exists on at least one of the first division and the second division.

Example embodiments provide that the first clock rate has a different speed than the second clock rate.

Example embodiments provide that the executing further includes simultaneously executing the task on the first division and on the second division.

Example embodiments provide that the method further includes defining a first division clock for the first division to measure a first division time by counting a number of first division ticks that have transpired from the desired start time. Each first division tick represents an amount of time required to execute a program instruction of the task according to the first division clock rate. The method further includes defining a second division clock for the second division to measure a second division time by counting a number of second division ticks that have transpired from the desired start time. Each second division tick represents an amount of time required to execute a program instruction of the task according to the second division clock rate.

Example embodiments provide that the processor operates according to a system clock, and the method further includes measuring a system time by counting a number of system ticks that have transpired from a desired start time. The system clock has a system clock rate, where each system tick represents an amount of time required to execute a program instruction of the task according to the system clock rate.

Example embodiments provide that at least one of (i) each of the first division ticks represent both the amount of time required to execute a program instruction of the task according to the first division clock rate and a delay in initiating an execution of a next program instruction of the task; and (ii) each of the second division ticks represent both the amount of time required to execute a program instruction of the task according to the second division clock rate and a delay in initiating the execution of the next program instruction of the task.

Example embodiments provide that the method further includes varying the execution of the task on the first division based on at least one of the first division clock rate and the system time, and varying the execution of the task on the second division based on at least one of the second division clock rate and the system time.

Example embodiments provide that the method further includes obtaining data from at least one input; monitoring the obtained data; generating trip information based on the obtained data; and performing a divisional voting process based on the trip information, the divisional voting process being used to detect discrepancies of at least one of the first division and the second division.

At least one example embodiment relates to a method of executing a task in order to reduce common mode failures in a computing system, where the computing system includes a plurality of divisions, and each of the plurality of divisions has a different clock rate.

In one example embodiment the method includes varying, by a processor, a program speed of each of the plurality of divisions such that the task, when executed on a corresponding one of the plurality of divisions, operates at a clock rate according to the corresponding one of the plurality of divisions.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF EMBODIMENTS

Figure 1:
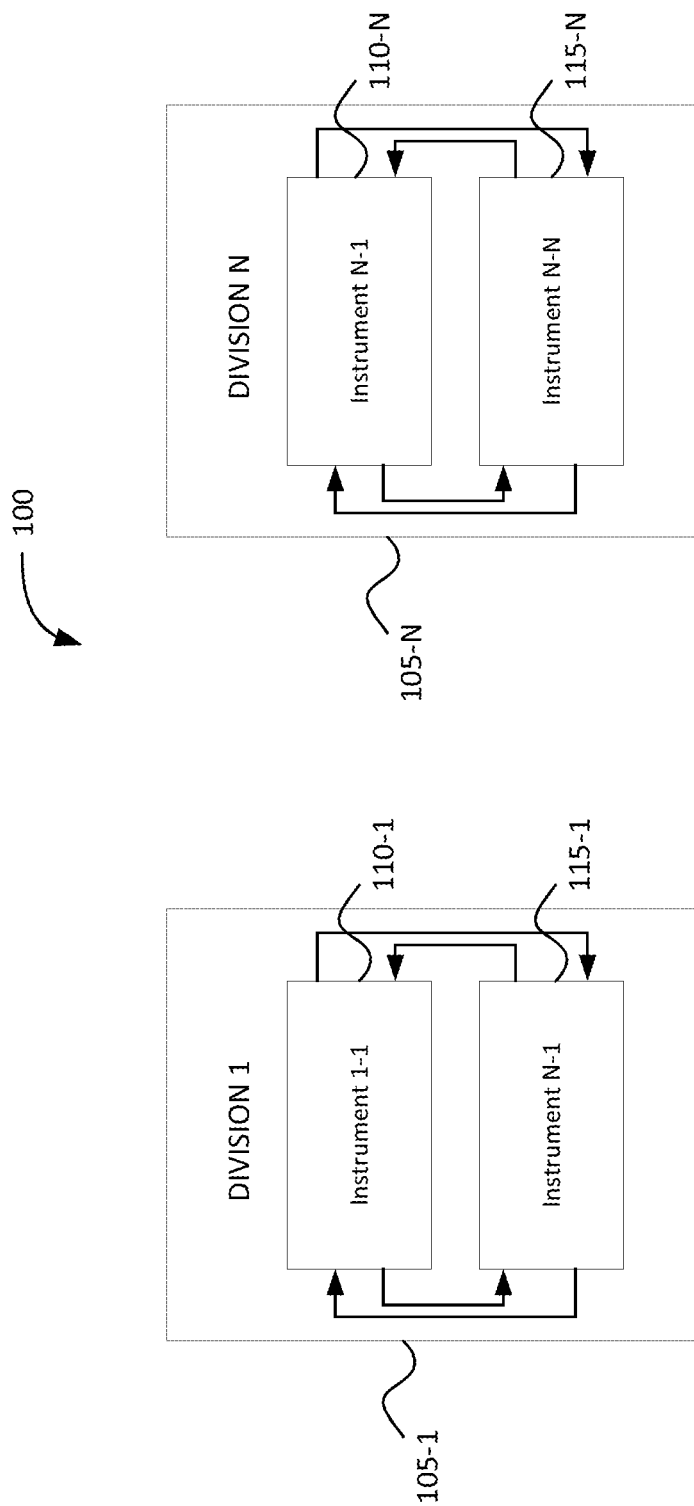
FIG. 1 illustrate a monitoring system including multiple redundant divisions of instrumentation, according to an example embodiment.

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits, field programmable gate arrays (FPGAs) computers or the like.

The example embodiments of a monitoring and control system allow a processor to have variable clock rates in different divisions of nuclear safety equipment (hereinafter referred to as "divisions"), which use the same software and hardware in nuclear safety-related applications. By varying the clock speed for each division running and/or executing the same task, a program timing of the task being executed on each division may be different. Because each division executes the same task at different speeds, each division is asynchronous relative to one another in the monitoring and control system. In this way, possible software-related common-mode failures (CMFs) may be reduced or otherwise mitigated.

It should be noted that, although the example embodiments may apply to nuclear safety related systems, the example embodiments may also apply to any redundant system including but not limited to non-safety related nuclear equipment, aviation equipment, medical equipment, and other like redundant systems. It should also be noted that the example embodiments may also apply to actuation systems and/or control systems with open loop control devices or closed loop control devices.

Example embodiments include multiple divisions, each of which employ a processor that allows a clock rate of the division to vary. Such processors are typically used to lower the clock rate to reduce power consumption, but when applied to nuclear safety control systems the variable rate can be used to alter the execution order of one or more tasks or threads in redundant divisions, thereby mitigating possible CMF risk.

Example embodiments include a division clock. A division clock may be created using a hardware timer and/or a software timer that is a fixed function of the clock rate that is defined for the division. When the timer expires, an interrupt may be generated by the processor and an Operating System (OS) may count the time as a "tick". A tick may be an arbitrary unit that represents an amount of time required to execute a program instruction of a task according to the clock rate. Thus, a tick is an amount of time it takes for the timer to expire, and will vary with the rate at which the processor is clocked.

Example embodiments include an OS that works in conjunction with the processor that can vary its processor clock rate. The OS provides a traditional scheduling service, where a specific task or thread is scheduled to run based on a recurring time. In addition to the traditional service, the OS scheduler may be configured to schedule a task or thread based on ticks instead of time. Executing the same software on the same hardware in two or more divisions, but with a mix of tasks or threads that are fixed in time as well as fixed by ticks, will cause the fixed time task or thread to run at the same rate, while the fixed tick tasks or thread will run faster or slower as determined by the clock rate. Additionally, according to example embodiments, when the OS allows a task to run to completion, delays (e.g., internal delays due to initiating an execution of a next program instruction of a task) to the task or thread may cause the order of execution and/or program timing to vary between divisions, even though the same software and hardware is running and processing the same input signals.

FIG. 1 illustrates a monitoring system 100 including multiple redundant divisions, according to an example embodiment. The monitoring and control system 100 includes divisions 105-1-105-N (where N≥2) (hereinafter referred to as "divisions 105"). Additionally, divisions 105 each include instruments 110-1-110-N and instruments 115-1-115-N (where N≥2) (hereinafter referred to as "instruments 110-115"). FIG. 1 is a representation of a system with multiple divisions, each of which has multiple instruments, and where each instrument has at least one processor.

The monitoring system 100 may be considered a "redundant" monitoring system because each of the divisions 105 have the same or similar instruments and/or components. Although each of the divisions 105 include the same or similar instruments, each of the divisions 105 may operate according to different clock rates. Each of the divisions 105 measure a time (i.e., a "division time") by counting a number of ticks that have transpired from a desired start time. Each tick represents an amount of time required to execute a program instruction of a desired task. Because each division has a different clock rate, an amount of time required to execute a given task on each division will also be different. Consequently, a tick measured on one division will represent a different amount of time than another tick measured on another division. In various embodiments, the divisions 105 of the monitoring system 100 may simultaneously execute the same task. In such embodiments, the speed at which the task is executed will vary depending on the clock rate of the division on which the task is executed.

Additionally, the monitoring system 100 may also be considered a redundant monitoring system because, as described in detail below, when the minimum number of the divisions 105 (as determined by the voting logic for example two-out-of-four) are indicated as a "trip" and/or a "fault", then the system may trip a component, device, system, or in some embodiments, an entire NPP. The term "trip" and/or "fault" (or alternatively a "reactor trip", "scram", "initiation", and the like) may refer to any initialization and/or activation of a shutdown and/or actuation procedure with respect to a desired component, device, system, and/or NPP. For example, in the monitoring system 100, if a division (e.g., division 1) fails or is otherwise in a faulted state and is unable to send a trip signal, a second division (e.g., division N), which may be configured to monitor all trip conditions, when called upon, may send the trip signal. The trip signal may be used to take the tripped and/or failed division offline. According to example embodiments where a system is configured with four divisions, each division may receive trip inputs from one of the other divisions and perform a voting procedure, whereby the divisions vote on whether the system should actuate an external device (e.g., scram the NPP). A faulted input from one division may be considered a trip by the other divisions in a fail-safe system or may be ignored in other systems.

As shown in FIG. 1, only two divisions 105 are present. However, according to various embodiments, any number of divisions, greater than two, may be present. Additionally, in various embodiments, the divisions may be networked devices or they may be provided as a single device.

According to various embodiments, each of the instruments 110-1-110-N (where N≥2) (hereinafter referred to as "instruments 110") is a physical computer hardware device capable of communicating with one or more other hardware computing devices via a communications interface, and instruments 110 may include memory, one or more processors, and other like hardware components. Instruments 110 may be configured to send/receive data to/from other hardware devices, such as a one or more sensors (not shown), via an optical, wired, and/or wireless connection (not shown). For example, instruments 110 may include one or more hardware devices and/or software components to measure and analyze a number and energy level of neutrons striking an associated one or more neutron detectors (not shown). Accordingly, instruments 110 may act as a "gateway" that receives one or more signals from one or more sensors, filters and/or processes the one or more received signals, and forwards the filtered and/or processed signals to instruments 115-1-115-N (where N≥2) (hereinafter referred to as "instruments 115").

According to various embodiments, each of the instruments 115 is a physical computer hardware device that performs a voting procedure based on trip information received from the instrument 110 located in division 1 and/or trip information received from other divisions. To that end, instruments 115 may include one or more hardware devices (e.g., memory, one or more processors, and other like hardware components) and/or software components to carry out a voting procedure, such as a two-out-of-four voting procedure for a monitoring system having four divisions. The voting procedure is used to determine whether one or more of the divisions 105 are in a trip condition (or alternatively, "tripped"). A voting procedure (or alternatively, a voting logic system) is often used to detect discrepancies and/or inconsistencies in redundant systems. In a voting system, if a signal or other like voting mechanism becomes unavailable, the voting system may be determined to enter a degraded mode. For instance, if a division experiences a CMF or otherwise becomes compromised, a signal from the division may be halted or otherwise interrupted. Without the signal from the division, or when the signal is determined to be interrupted, the voting system may determine that the division is in a trip condition. If one of the instruments 115 determines that a minimum required number of divisions 105 are tripped, then the instrument may initiate a trip procedure, such that the NPP or other like system is shut down and/or taken offline. In various embodiments, instead of shutting down or taking a system offline, a trip procedure may initiate one or more other safety systems and/or procedures. In various embodiments, the trip procedure may include issuing a notification (or alternatively, "flagging"), or may involve generating or otherwise defining a database record or other like file that contains information indicating that a trip condition exits.

It should be noted that the instruments instrument 110, instrument 115, etc., may be grouped together or otherwise arranged, either logically and/or physically, based upon a desired system or desired application. As shown in FIG. 1, only a single instrument 110 and a single instrument 115, are present within each of the divisions 105. According to various embodiments, the divisions 105 may include any number of the instruments 110-115. Additionally, in various embodiments, there may be many more instruments and/or components than those shown in FIG. 1, such as a control device or group of control devices, that manages, commands, directs, and/or regulates the various instruments of the multiple divisions of the monitoring system 100. However, it is not necessary that all of these generally conventional instruments and/or components be shown in order to disclose the example embodiments. Furthermore, it should be noted that example embodiments are not limited to the described voting system, and may use any majority voting logic system to initiate a safety function and/or safeguard actuation.

Figure 2:
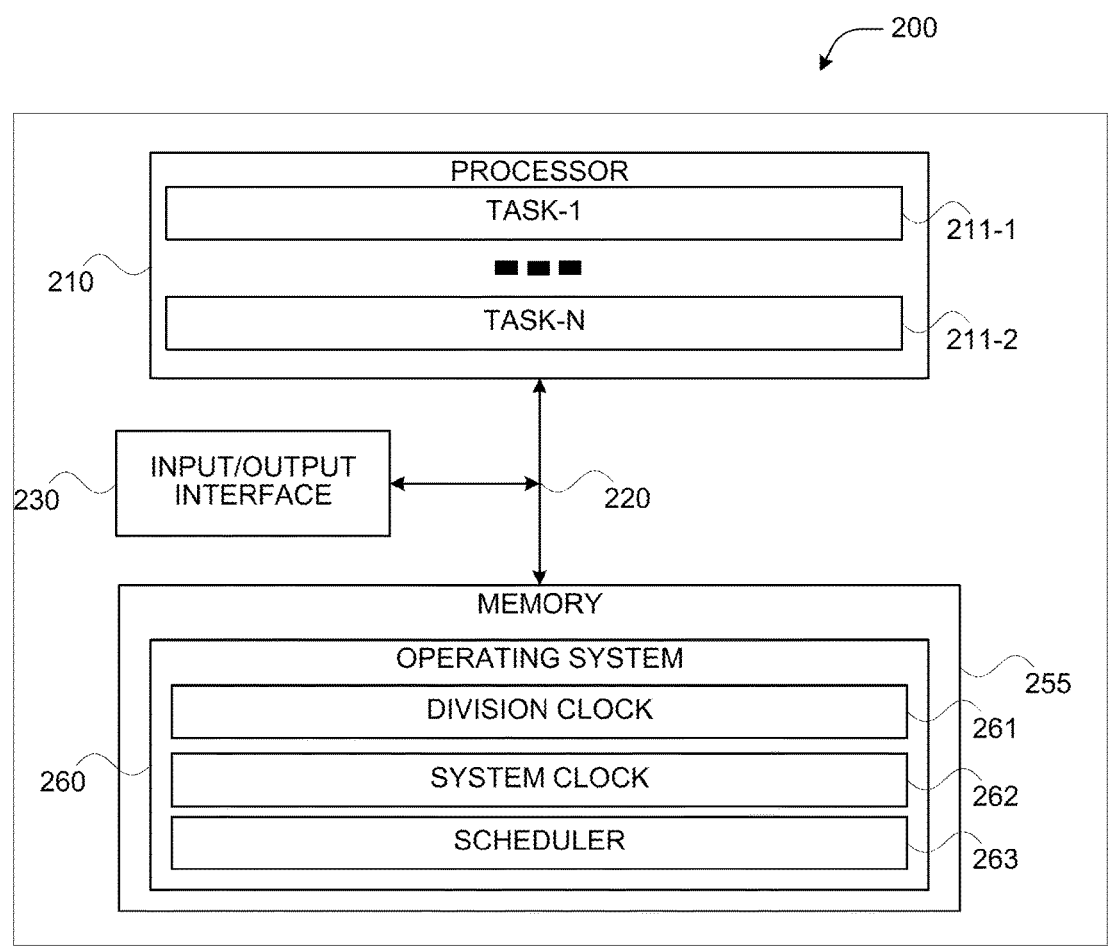
FIG. 2 illustrates the components of a processor contained in instruments that are employed by the each of the redundant divisions of the monitoring system of FIG. 1, according to an example embodiment.

FIG. 2 illustrates the components of an instrument 200 (e.g., instruments 110 and/or instruments 115.) that is employed by the one or more divisions (e.g., divisions 105) of a monitoring system (e.g., monitoring system 100), according to an example embodiment. As shown, instrument 200 includes processor 210, bus 220, input/output interface 230, and memory 255. During operation, memory 255 includes operating system 260, which includes division clock 261, system clock 262, and scheduler 263; and processor 210 includes tasks 1-N (where N is an integer greater than or equal to 2). In some embodiments, instrument 200 may include many more components than those shown in FIG. 2. However, it is not necessary that all of these generally conventional components be shown in order to disclose the example embodiments.

Memory 255 may be a computer readable storage medium that generally includes a random access memory (RAM), read only memory (ROM), and a permanent mass storage device, such as a disk drive. Memory 255 also stores operating system 260, which includes division clock 261, system clock 262, and scheduler 263.

Division clock 261 may measure a division time that may be implemented as a count of a number of division ticks that have transpired since a desired starting time and/or date. A speed of the division clock 261 is based on a clock rate that is defined for the division on which the instrument 200 is installed or otherwise associated with. System clock 262 may measure a system time that may be implemented as a count of a number of system ticks that have transpired since a desired starting time and/or date. A speed of the system clock 262 is based on a clock rate that is defined for the monitoring system (e.g., the monitoring system 100) that the instrument 200 is associated with. The number of ticks representing system time may be different in one or more processors located in each division, and the system time may be a function of the speed at which the one or more processors are executing or clocked. Additionally, it should be noted that processors having different clock speeds performing the same tasks are inherently asynchronous, may cause the scan rate through each application program to run at different rate. Because the task operations are executed asynchronously, anomalies caused by a certain sequence of events are unlikely to occur in both divisions.

The clock rates for each of the division clock 261 and the system clock 262 may be implemented using oscillator crystals, phased lock loop control systems, and/or any other like device that generates a fixed reference signal. Additionally, each oscillator crystal, phased lock loop control systems, and/or other like device may operate at different frequencies. Furthermore, in various embodiments, the processor 210 may be configured to vary a speed of the clock rate of the division clock 261 based on the frequency of the oscillator crystal, phased lock loop control system, and other like device. In such embodiments, each oscillator crystal, phased lock loop control systems, and/or other like device may operate at the same frequency, but may have a clock rate that is varied by the processor 210.

In various embodiments, division clock 261 and system clock 262 may each be implemented as a programmable interval timer that interrupts the processor 210, which then starts a timer interrupt. In such embodiments, once a timer interrupt for the division clock 261 expires and/or runs-out one division tick is added to the division clock 261, and once a timer interrupt for the system clock 262 expires and/or runs-out one system tick to the system clock 262.

The scheduler 263 may implement a scheduling method by which tasks (e.g., tasks 1-N), threads, processes, and/or data flows are given access to the resources of instrument 200 (e.g., run time on processor 210, and the like).

Additionally, memory 255 may include program code for booting, starting, and/or initializing the instrument 200. These software components may also be loaded from a separate computer readable storage medium into memory 255 using a drive mechanism (not shown). Such separate computer readable storage medium may include a floppy drive, disc, tape, DVD/CD-ROM drive, memory card, and/or other like computer readable storage medium (not shown). In some embodiments, software components may be loaded into memory 255 from a remote data storage device (e.g., databases 125A-D) via input/output interface 230, rather than via a computer readable storage medium.

Processor 210 may be configured to carry out instructions of a computer program by performing basic arithmetical, logical, and input/output operations of the system. Instructions may be provided to processor 210 by memory 255 via bus 220. Processor 210 is configured to execute program code for tasks 1-N. Such program code may be stored in a storage device (e.g., memory 255).

Bus 220 enables the communication and data transfer between the components of network element 200. Bus 220 may comprise a high-speed serial bus, parallel bus, storage area network (SAN), and/or other suitable communication technology.

Input/output interface 230 is a computer hardware component that connects instrument 200 to the other instruments in the division on which instrument 200 is implemented, and/or one or more instruments of other divisions. Input/output interface 230 is configured to receive one or more input signals from one or more input devices and output one or more output signals to one or more instruments and/or components. Input/output interface 230 may connect instrument 200 to other instruments via an optical, wired, and/or wireless connection.

Figure 3:
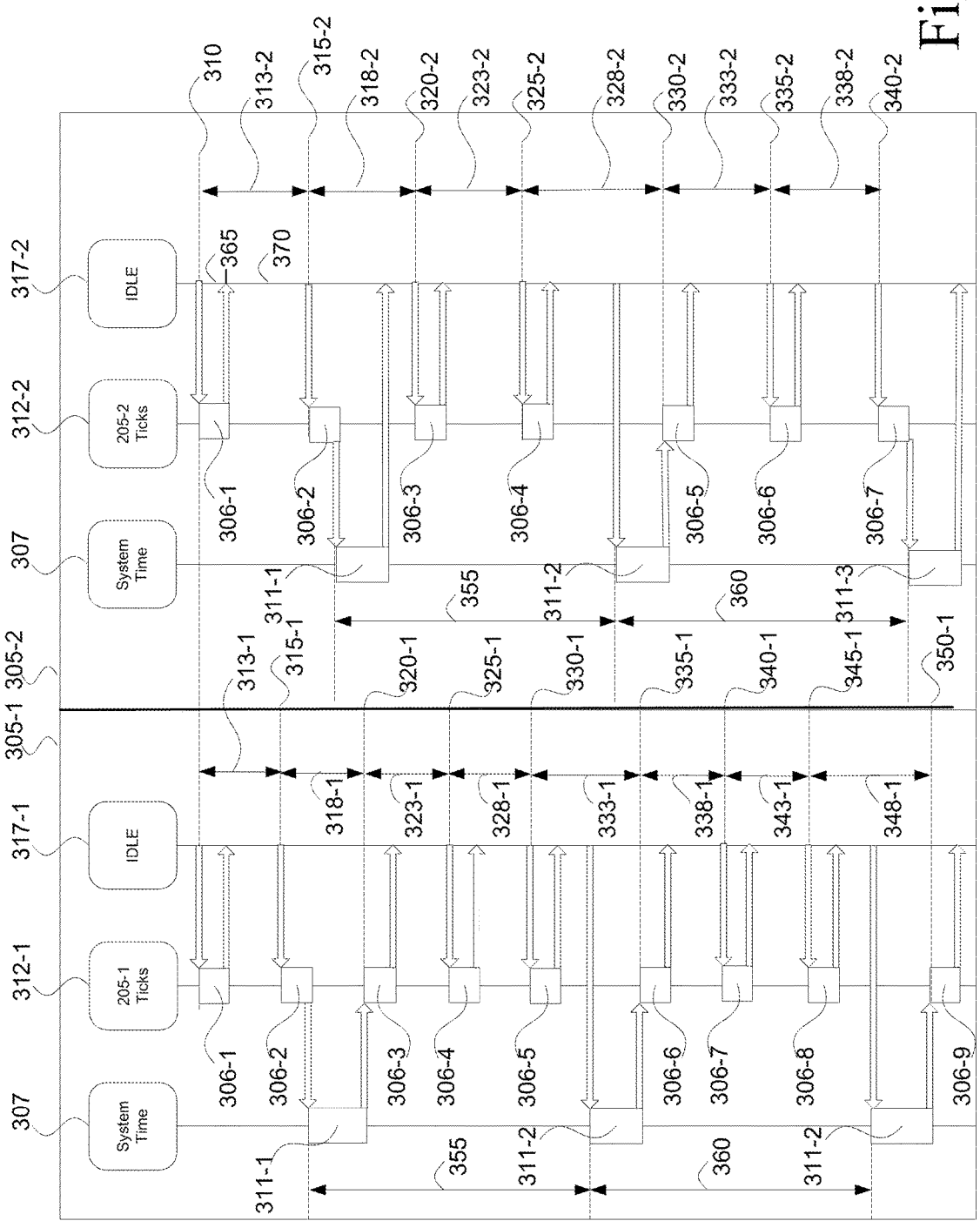
FIG. 3 illustrates a variable clock timing diagram, according to an example embodiment.

FIG. 3 illustrates a variable clock timing diagram 300, according to an example embodiment. Variable clock timing diagram 300 includes divisions 305-1 and 305-2; system time 307; division time 312-1-312-2; idle time 317-1-317-2; program instructions 306-1-306-2; system instructions 311-1-311-2; time points 310-1-310-2, 315-1-315-2, 320-1-320-2, 325-1-325-2, 330-1-330-2, 335-1-335-2, 340-1-340-2, 345-1-345-2, and 350-1-350-2; and division ticks 313-1-313-2, 318-1-318-2, 323-1-323-2, 328-1-328-2, 333-1-333-2, 338-1-338-2, 343-1, and 348-1; and system ticks 355-360.

According to various embodiments, divisions 305-1-305-2 have the same or similar instruments as the divisions 1-4 as discussed above with respect to FIGS. 1A-1B, each of which have the same or similar components as instrument 200 as discussed above with respect to FIG. 2. Variable clock timing diagram 300 shows timing of events occurring on each of the divisions 305-1 and 305-2. System time 307 shows a timing of events occurring (e.g., execution of system tasks) relative to a monitoring system (e.g., monitoring system 100). The system time 307 operates according to a system clock being operated by a control device of the monitoring system. Division time 312-1 shows a timing of events occurring (e.g., program instructions being executed by division 305-1) relative to division 305-1. The division time 312-1 operates according to a division clock that is defined for division 305-1. Division time 312-2 shows a timing of events occurring (e.g., program instructions being executed by division 305-2) relative to division 305-2. The division time 312-2 operates according to a division clock that is defined for division 305-2. Idle time 317-1 shows a timing of idling occurring relative to division 305-1. Idle time 317-2 shows a timing of idling occurring relative to division 305-2. The term "idling" may refer to a delay in initiating an execution of a next program instruction of a task.

Program instructions 306-1-306-9 represent program instructions of a task, which are executed by a corresponding division. As shown in FIG. 3, each of the divisions 305-1-305-2 execute the same task, and thus, each of the divisions 305-1-305-2 execute the same program instructions. As shown, program instructions 306-1-306-9 are executed by division 305-1, and program instructions 306-1-306-7 are executed by division 305-2. Additionally, some of the program instructions 306-1-306-9 may rely on a system instruction 311-1-311-3 executed by the monitoring system. Each of the program instructions 306-1-306-9 may include one or more data handling operations, one or more arithmetic and/or logic operations, one or more control flow operations, and/or one or more other like operations. Each of the program instructions 306-1-306-9 may have a program instruction length of any size. Each of the program instructions 306-1-306-9 may have a same or equal program instruction length, or may have varying program instruction lengths.

System instructions 311-1-311-2 represent program instructions of the task, which are executed by a central processor of the monitoring system. As shown, system instructions 311-1-311-3 are executed by monitoring system and rely on a program instruction executed by division 305-1 and also rely on a program instruction executed by division 305-2. Each of the system instructions 311-1-311-2 may include one or more data handling operations, one or more arithmetic and/or logic operations, one or more control flow operations, and/or one or more other like operations. Each of the system instructions 311-1-311-3 may have a program instruction length of any size. Each of the system instructions 311-1-311-3 may have a same or equal program instruction length, or may have varying program instruction lengths.

According to various embodiments, time points 310-1-310-2, 315-1-315-2, 320-1-320-2, 325-1-325-2, 330-1-330-2, 335-1-335-2, 340-1-340-2, 345-1-345-2, and 350-1-350-2 represent a time at which a program instruction 306-1-306-2 are executed by the divisions 305-1-305-2.

According to various embodiments, division ticks 313-1-313-2, 318-1-318-2, 323-1-323-2, 328-1-328-2, 333-1-333-2, 338-1-338-2, 343-1, and 348-1 represent an amount of time (or alternatively, a time interval) required to execute a program instruction of the task on a corresponding division. The clock rates defined for each of the divisions 305-1-305-2 define a frequency at which each program instruction 306-1-306-2 are executed on the divisions 305-1-305-2. Each of the divisions 305-1-305-2 measure a division time 312-1-312-2 by counting a number of ticks that have transpired from a desired start time.

As shown in FIG. 3, division 305-1 has a smaller tick between executing program instructions relative to division 305-2. Thus, division 305-1 has a higher clock rate than division 305-2. Accordingly, division 305-1 is able to execute more program instructions than division 305-2 in a desired amount of time. By way of example, division 305-1 may have a clock rate of 60 megahertz (MHz) and division 305-2 may have a clock rate of 50 MHz, and thus, as shown in FIG. 3 division 305-1 executes nine program instructions (e.g., program instructions 306-1-306-9), whereas division 305-2 executes seven program instructions (e.g., program instructions 306-1-306-7) in the same amount of time. It should be noted that the number of program instructions executed per clock cycle may not be constant for each of the divisions 305-1-305-2. The number of program instructions executed per clock cycle may depend a hardware architecture being employed by the division on which the task is being executed, how each program instruction interacts with the processor of the division and/or a control device of the monitoring system, and/or a delay time in initiating an execution of a next program instruction.

Additionally, in various example embodiments, a control device of the monitoring system (not shown) may vary the clock rates of each of the divisions 305-1-305-2, such that division 305-2 has a higher frequency than division 305-1 (not shown).

According to various embodiments, system ticks 355-360 represent an amount of time (or alternatively, a time interval) required to execute a program instruction of the task by a control device of the monitoring system. The clock rates defined for the monitoring system define a frequency at which each program instruction is executed by the control device the monitoring system. The monitoring system measures a system time 307 by counting a number of system ticks that have transpired from a desired start time. Because the system time 307 is the same for each division, the system time may act as a reference time for each of the divisions in the monitoring system.

According to various embodiments, the division ticks 313-1-313-2, 318-1-318-2, 323-1-323-2, 328-1-328-2, 333-1-333-2, 338-1-338-2, 343-1, and 348-1 may also include an execution time and a delay time (or alternatively, a latency time) in initiating an execution of a next program instruction. In such embodiments, a tick (e.g.,) may be represented by the execution time plus a delay time. For example, as shown in FIG. 3, division tick 313-2 is represented by execution time 365 and delay time 370. By incorporating a delay time into a tick, the asynchronous operation of each division of the monitoring division may be expanded, and thus, software-related CMFs may be further reduced, mitigated, or otherwise prevented. It should be noted that, in addition to each division operating according to a different clock rate, in various embodiments, each division may have a different a delay time.

As will be appreciated, the methods and apparatuses according the example embodiments have several advantages. First, the example embodiments allow a clock speed for each division of a monitoring system to be varied, such that tasks that are executed on different divisions have a different a program timing, which allows each division to be asynchronous relative to one another in the monitoring system, thereby reducing and/or mitigating software-related CMFs. Second, the example embodiments are cost-effective because the example embodiments allow for multiple redundant divisions of nuclear-safety related applications to be used without hardware redesigns.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed:

1. A computing system for executing a task according to different clock rates in order to reduce common mode failures in a nuclear safety system configured to monitor a nuclear reactor, the computing system comprising:
    at least a first division and a second division, the first division associated with a first clock rate and the second division associated with a second clock rate, the first division and the second division each including a respective instrument;
    the first division including a first processor configured to generate first output data based on executing a task on the first division to process signals from one or more nuclear reactor sensors generating sensor data associated with the nuclear reactor according to the first clock rate; and
    the second division including a second processor configured to generate second output data based on executing the task on the second division to process signals from one or more nuclear reactor sensors generating sensor data associated with the nuclear reactor according to the second clock rate,
    wherein each respective instrument of the first division and second division is configured to,
        determine whether a trip condition exists on at least one of the first division and the second division, based on detecting at least one discrepancy between the first output data and the second output data, the existence of a trip condition on a given division being associated with a determination at the given division, based on output data generated at the given division, that the nuclear reactor is in a condition that exceeds a set of safe operational limits associated with the nuclear reactor;
        determine whether a faulted state exists on at least one division of the first division and the second division, such that the at least one division is a faulted division, based on detecting a faulted input from the faulted division, the faulted input being an absence of output data generated by the faulted division; and
        actuate a common instance of nuclear safety equipment to initiate a shutdown of the nuclear reactor, based on a determination that at least one of a trip condition and a faulted state exists on at least a threshold number of divisions.

2. The computing system of claim 1, wherein the threshold number of divisions is two divisions.

3. The computing system of claim 1, wherein the first clock rate has a different speed than the second clock rate.

4. The computing system of claim 1, wherein the task is simultaneously executed on the first division and on the second division.

5. The computing system of claim 1, wherein,
    the first division comprises a first division clock configured to measure a first division time by counting a number of first division ticks that have transpired from the desired start time, each first division tick representing an amount of time required to execute a program instruction of the task according to the first division clock rate, and
    the second division comprises a second division clock configured to measure a second division time by counting a number of second division ticks that have transpired from the desired start time, each second division tick representing an amount of time required to execute a program instruction of the task according to the second division clock rate.

6. The computing system of claim 5, further comprising:
    a system clock configured to measure a system time by counting a number of system ticks that have transpired from a desired start time, the system clock having a system clock rate, each system tick representing an amount of time required to execute a program instruction of the task according to the system clock rate.

7. The computing system of claim 6, wherein at least one of
    (i) each of the first division ticks represent both the amount of time required to execute a program instruction of the task according to the first division clock rate and a delay in initiating an execution of a next program instruction of the task, and
    (ii) each of the second division ticks represent both the amount of time required to execute a program instruction of the task according to the second division clock rate and a delay in initiating the execution of the next program instruction of the task.

8. The computing system of claim 6, wherein,
    the first processor is further configured to vary the execution of the task on the first division based on at least one of the first division clock rate and the system time; and
    the second processor is further configured to vary the execution of the task on the second division based on at least one of the second division clock rate and the system time.

9. The computing system of claim 1, wherein each respective instrument of the at least first division and second division is configured to, obtain output data from at least one processor,
    monitor the obtained output data,
    generate trip information associated with a division on which the at least one processor executes a task based on the obtained output data, and
    determine whether the division is in a trip condition, based on the trip information.

10. A method of executing a task in order to reduce common mode failures in a nuclear safety system configured to monitor a nuclear reactor, the method comprising:
    dividing the computer system into at least a first division and a second division, the first division and the second division each including a respective instrument;
    defining a first clock rate for the first division and a second clock rate for the second division;
    generating first output data based on executing the task on the first division to process signals from one or more nuclear reactor sensors generating sensor data associated with the nuclear reactor according to the first clock rate;

generating second output data based on executing the task on the second division to process signals from one or more nuclear reactor sensors generating sensor data associated with the nuclear reactor according to the second clock rate; and operating each respective instrument of the first division and second division to, at each respective instrument,
  determine whether a trip condition exists on at least one of the first division and the second division, based on detecting at least one discrepancy between the first and second output data, the existence of a trip condition on a given division being associated with a determination at the given division, based on output data generated at the given division, that the nuclear reactor is in a condition that exceeds a set of safe operational limits associated with the nuclear reactor;
  determine whether a faulted state exists on at least one division of the first division and the second division, such that the at least one division is a faulted division, based on detecting a faulted input from the faulted division, the faulted input being an absence of output data generated by the faulted division; and
  actuate a common instance of nuclear safety equipment to initiate a shutdown of the nuclear reactor, based on a determination that at least one of a trip condition and a faulted state exists on at least a threshold number of divisions.

11. The method of claim 10, wherein the threshold number of divisions is two divisions.

12. The method of claim 10, wherein the first clock rate has a different speed than the second clock rate.

13. The method of claim 10, wherein the executing further comprises:
  simultaneously executing the task on the first division and on the second division.

14. The method of claim 10, wherein the processor operates according to a system clock, and the method further comprises:
  defining a first division clock for the first division to measure a first division time by counting a number of first division ticks that have transpired from the desired start time, each first division tick representing an amount of time required to execute a program instruction of the task according to the first division clock rate, and
  defining a second division clock for the second division to measure a second division time by counting a number of second division ticks that have transpired from the desired start time, each second division tick representing an amount of time required to execute a program instruction of the task according to the second division clock rate.

15. The method of claim 14, further comprising:
  measuring a system time by counting a number of system ticks that have transpired from a desired start time, the system clock having a system clock rate, each system tick representing an amount of time required to execute a program instruction of the task according to the system clock rate.

16. The method of claim 15, wherein at least one of
  (i) each of the first division ticks represent both the amount of time required to execute a program instruction of the task according to the first division clock rate and a delay in initiating an execution of a next program instruction of the task, and
  (ii) each of the second division ticks represent both the amount of time required to execute a program instruction of the task according to the second division clock rate and a delay in initiating the execution of the next program instruction of the task.

17. The method of claim 16, further comprising
  varying the execution of the task on the first division based on at least one of the first division clock rate and the system time; and
  varying the execution of the task on the second division based on at least one of the second division clock rate and the system time.

18. The method of claim 10, further comprising:
  obtaining output data from at least one processor;
  monitoring the obtained output data;
  generating trip information associated with a division on which the at least one processor executes a task based on the obtained output data; and
  determine whether the division is in a trip condition, based on the trip information.

19. A method of executing a task in order to reduce common mode failures in a nuclear safety system configured to monitor a nuclear reactor, the computing system including a plurality of divisions, each of the plurality of divisions having a different clock rate, the method comprising:
  varying, by a processor, a program speed of each of the plurality of divisions such that the task, when executed on a corresponding one of the plurality of divisions to process signals from one or more nuclear reactor sensors generating sensor data associated with the nuclear reactor, operates at a clock rate according to the corresponding one of the plurality of divisions such that each of the plurality of divisions generates output data based on executing the task to process signals from one or more nuclear reactor sensors generating sensor data associated with the nuclear reactor, wherein each of the plurality of divisions includes a respective instrument; and
  operating each respective instrument of the plurality of divisions to, at each respective instrument,
    determine whether a trip condition exists on at least one of the plurality of divisions, based on detecting at least one discrepancy between output data generated by each of the plurality of divisions, the existence of a trip condition on a given division being associated with a determination at the given division, based on output data generated at the given division, that the nuclear reactor is in a condition that exceeds a set of safe operational limits associated with the nuclear reactor;
    determine whether a faulted state exists on at least one division of the first division and the second division, such that the at least one division is a faulted division, based on detecting a faulted input from the faulted division, the faulted input being an absence of output data generated by the faulted division; and
    actuate at least one common instance of nuclear safety equipment to initiate a shutdown of the nuclear reactor, based on determining that the trip condition exists on at least a threshold number of divisions.

20. The method of claim 19, wherein the threshold number of divisions is two divisions.

* * * * *